Figure 1:
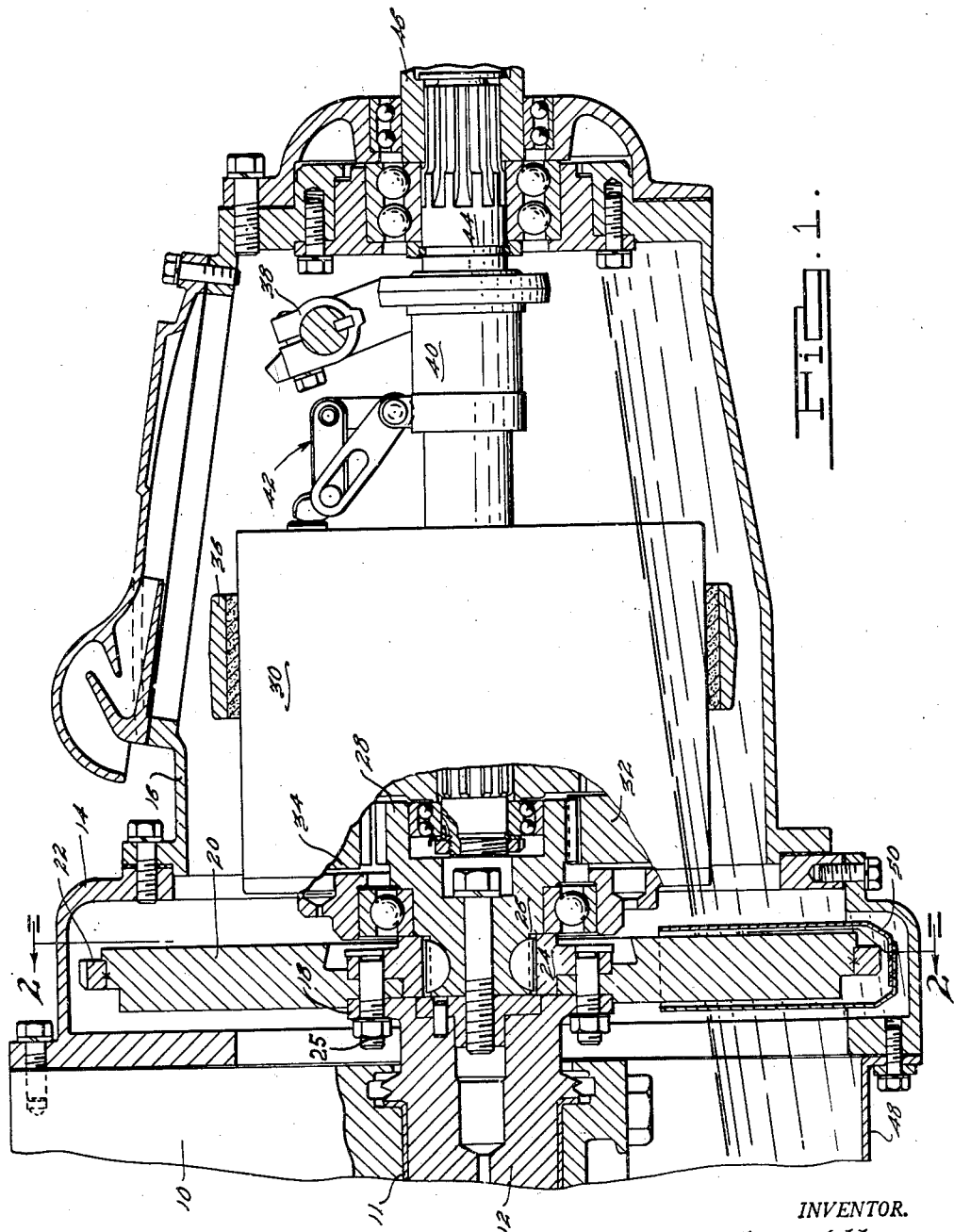

March 8, 1949.  D. A. WALLACE  2,464,012
POWER PLANT CONSTRUCTION
Filed May 17, 1947  2 Sheets-Sheet 1

INVENTOR.
David A. Wallace.
BY
Harness and Harris
ATTORNEYS.

Patented Mar. 8, 1949

2,464,012

UNITED STATES PATENT OFFICE 2,464,012

POWER PLANT CONSTRUCTION

David A. Wallace, Grosse Pointe Farms, Mich., assignor to Chrysler Corporation, Highland Park, Mich., a corporation of Delaware Application May 17, 1947, Serial No. 748,830

5 Claims. (Cl. 184—11)

This invention relates to power plants and more particularly to improvements in power plants adapted to use a common lubricant for the engine and transmission thereof.

Power plants for marine engines are of a type to which the invention may readily be applied and for this reason a marine engine and transmission have been illustrated and will be described herein, although it is to be understood that the invention is not limited to this type of power plant and that it could be applied to any engine in which the characteristics of the invention are desirable.

Power plants having a common lubricant for the engine crankcase and the transmission have heretofore usually been built with the flywheel at one end of the crankshaft and the transmission at the opposite end thereof. One reason for this has been the fact that to position a large flywheel between the engine and transmission complicates the handling of the lubricant.

It is an object of this invention to provide means adapted to facilitate the positioning of a flywheel between the crankcase of an engine and the associated transmission and to prevent the lubricant from being agitated by the rotation of the flywheel. Problems of pumping and lubrication introduced by "frothing" of the lubricant are avoided.

It is a further object of the invention to prevent the rotation of the flywheel through the lubricating oil in the sump from being retarded by contact with the lubricant at appreciable engine speeds.

Figure 2:
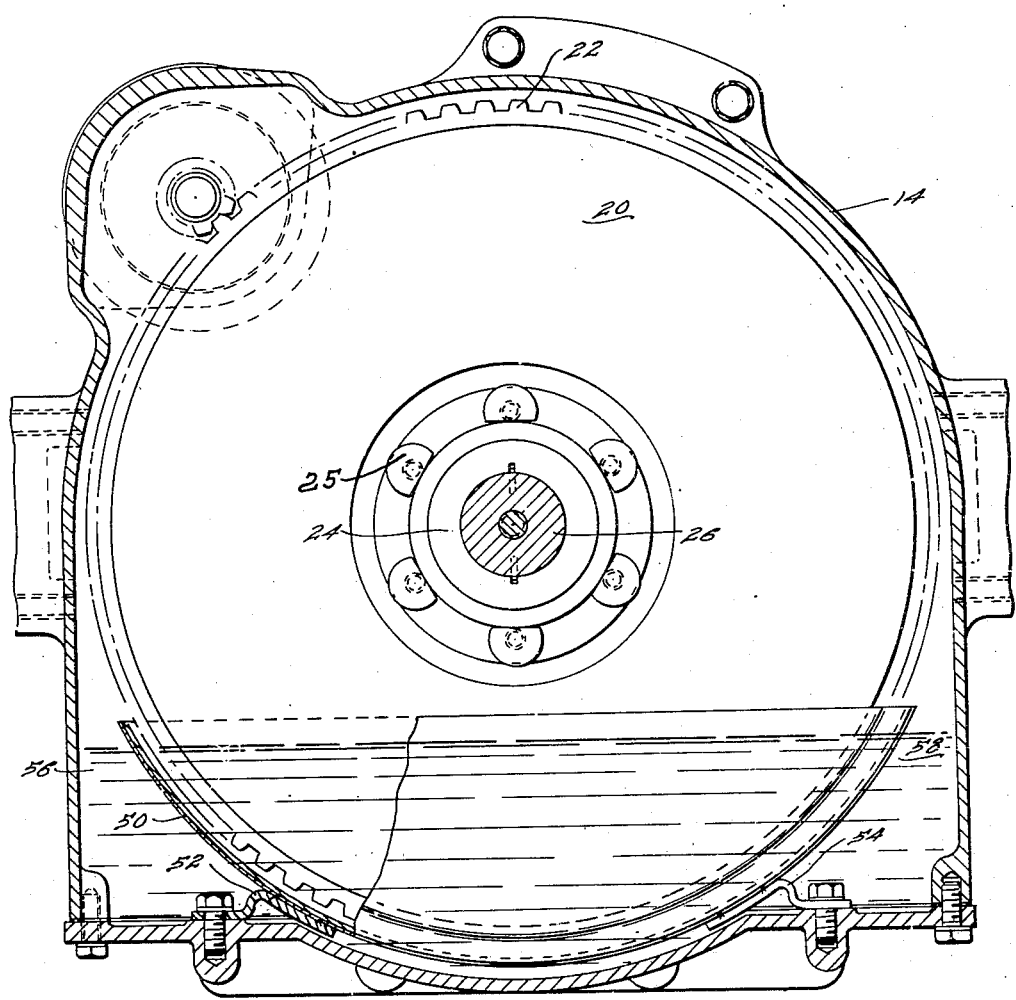

In the drawings:

Fig. 1 is a longitudinal view, partly in section, showing the relation of engine, flywheel and transmission, and Fig. 2 is a vertical section on the line 2—2 of Fig. 1.

In the drawings the numeral 10 designates a portion of the engine block of an internal combustion engine having a crankshaft 12 journalled in a bearing 11. A flywheel housing 14 is bolted to the engine block 10. A transmission housing 16 is bolted to the flywheel housing 14.

The crankshaft 12 is provided with a flange 18 to which a conventional flywheel 20 is bolted. The flywheel is located in housing 14 and has a ring gear 22 secured to the periphery thereof. Rotation of the crankshaft 12 rotates the flywheel 20. In starting, the converse is true in that a conventional starting motor, not shown, rotates the flywheel 20 by means of the ring gear 22 until the engine begins to operate under its own power.

Bolts 25 which secure the flywheel 20 to the flange 18 of the crankshaft also secure a collar 24 to the flywheel. Collar 24 is keyed to an extension 26 provided on a rotatably mounted pinion 28 which serves as the sun gear of a planetary transmission 30 located in the transmission housing 16. The transmission 30 is of conventional construction and includes planet gears 32 and 34, a reversing band 36, clutch actuating linkage 38, 40 and 42 and a driven shaft 44. The components of the transmission illustrated are described in detail in Patent 1,954,200 which issued on April 10, 1934, to H. E. Fromm. Other transmission constructions could be substituted for transmission 30 without departing from the invention to be described herein. The transmission driven shaft may be connected in any conventional manner to a propeller shaft. In Fig. 1 the driven shaft 44 is shown as splined to a propeller shaft universal joint 46.

My invention relates to a unitary lubricating system for the engine and transmission referred to above. A crankcase 48 which is secured to the engine block 10 and flywheel housing 14 forms a sump or reservoir for lubricating oil used to lubricate the engine. The flywheel housing 14 and transmission housing 16 are arranged in fluid flow relationship with the crankcase 48 and also form a portion of the sump for lubricating oil. The lubricating oil is collected in the lower portions of these housings as well as in the crankcase. The same oil supply is used to lubricate the transmission 30 and the engine.

The fact that the flywheel 20 is interposed between the engine and transmission combined with the fact that flywheels generally have a relatively large diameter introduces a problem. A portion of the flywheel will be immersed in the oil as shown in the drawings. Rotation of the flywheel through the oil would introduce two undesirable factors. First, the oil would be agitated and become "frothy." The teeth of the ring gear 22 would accentuate this action. This is undesirable because it impairs the lubricating characteristics of the oil and makes it difficult for the usual oil pump of a force feed lubricating system to pump the oil. Secondly, the oil would retard the flywheel and cause a loss of power.

I propose that an arcuate pan 50 having an open top and forming a channel through which a portion of the flywheel may rotate be secured to the flywheel housing 14. The pan preferably has a width slightly greater than the thickness of the flywheel and sufficient heighth so that its upper edge extends above the oil level in the sump. The pan preferably is formed in the shape of a segment of a circle. The flywheel housing 14, previously referred to, preferably has a greater cross sectional area than the pan in the region adjacent the pan (see Fig. 2) so that a fluid flow connection exists around the pan between the crankcase lubricant and the transmission lubricant. If desired the pan may be formed from two stamped sections which may be welded together as in Fig. 1. The pan 50 is illustrated in Fig. 2 as spot welded to a pair of brackets 52 and 54 which are bolted to the flywheel housing 14.

Any appreciable amount of oil which may accumulate in the pan 50 by drainage from surfaces located above the open top thereof or which may accumulate in the pan due to leakage around seams therein will be thrown out of the pan by the initial revolutions of the flywheel on starting of the engine. Thereafter, during operation of the engine the flywheel will be substantially isolated from the oil although a fluid flow relation between crankcase and transmission oil will be maintained through the spaces 56 and 58 which are located between the pan and the side walls of the flywheel housing.

I claim:

1. In combination with an engine and a transmission arranged for the transmission of power to a driven shaft, a flywheel operatively interposed between said engine and said transmission, means forming a reservoir for lubricating oil in the lower portion of said engine and adjacent the lower portion of said transmission, said flywheel having a radial portion extending into said reservoir, a pan located in said reservoir in surrounding relationship with said portion of said flywheel, said pan being adapted to form a channel through lubricant contained in said reservoir whereby said flywheel may penetrate said reservoir and rotate without agitating lubricant contained in said reservoir.

2. In combination with an engine and a transmission arranged for the transmission of power to a driven shaft, a flywheel operatively interposed between said engine and said transmission, means forming a reservoir for lubricating oil in the lower portion of said engine and adjacent the lower portion of said transmission, said flywheel having a radial portion extending into said reservoir, an arcuate pan conforming to the contour of a segment of said flywheel and located in said reservoir in surrounding relationship with said portion of said flywheel, said pan being adapted to project above the normal level of lubricant contained in said reservoir whereby said flywheel may penetrate said reservoir and rotate without agitating lubricant contained in said reservoir.

3. In combination with an engine and a transmission arranged for the transmission of power to a driven shaft, a flywheel operatively interposed between said engine and said transmission, means forming a first housing enclosing said transmission, means forming a second housing enclosing said flywheel, said engine being provided with a crankcase, means forming a fluid flow connection between said crankcase and said housings and forming a reservoir for lubricant in said crankcase and said housings, said flywheel having a radial portion extending into said reservoir, an open topped pan secured to said second housing and adapted to be partially immersed when said reservoir contains lubricant, said pan being positioned in surrounding relationship with said portion of said flywheel whereby said flywheel may rotate through said pan without contacting lubricant contained in said reservoir.

4. In combination with an engine and a transmission arranged for the transmission of power to a driven shaft, a flywheel operatively interposed between said engine and said transmission, means forming a first housing enclosing said transmission, means forming a second housing enclosing said flywheel, said engine being provided with a crankcase, means forming a fluid flow connection between said crankcase and said housings and forming a reservoir for lubricant in said crankcase and said housings, said flywheel having a radial portion extending into said reservoir, an open topped pan secured to said second housing and adapted to be partially immersed when said reservoir contains lubricant, said pan being positioned in surrounding relationship with said portion of said flywheel and being so dimensioned relative to said second housing that the fluid flow relationship between said crankcase and said first housing may be maintained through said second housing around said pan.

5. In combination with an engine and a transmission arranged for the transmission of power to a driven shaft, a flywheel operatively interposed between said engine and said transmission, means forming a reservoir for lubricating oil in the lower portion of said engine and adjacent the lower portion of said transmission, said flywheel having a radial portion extending into said reservoir, a pan located in said reservoir in surrounding relationship with said portion of said flywheel, said pan being so shaped that it is substantially filled by said portion of said flywheel, said pan being adapted to form a channel through lubricant contained in said reservoir whereby the initial rotary movements of said flywheel will substantially empty said pan of lubricant and thereafter said flywheel may rotate without agitating lubricant contained in said reservoir.

DAVID A. WALLACE.

No references cited.